United States Patent
Pan

(10) Patent No.: US 8,649,829 B1
(45) Date of Patent: Feb. 11, 2014

(54) METHOD AND APPARATUS FOR REDUCING POWER CONSUMPTION IN A PORTABLE ELECTRONIC DEVICE

(71) Applicant: Marvell International Ltd., Hamilton (BM)

(72) Inventor: Qi Pan, Shanghai (CN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/960,433

(22) Filed: Aug. 6, 2013

Related U.S. Application Data

(63) Continuation of application No. 12/130,885, filed on May 30, 2008, now Pat. No. 8,504,121.

(60) Provisional application No. 60/940,843, filed on May 30, 2007.

(51) Int. Cl.
*H04M 1/00* (2006.01)

(52) U.S. Cl.
USPC .......................................................... 455/574

(58) Field of Classification Search
USPC .......................................................... 455/574
See application file for complete search history.

(56) References Cited

U.S. PATENT DOCUMENTS

| | | | |
|---|---|---|---|
| 6,041,217 A | 3/2000 | Martin et al. | |
| 7,369,815 B2 * | 5/2008 | Kang et al. | 455/73 |
| 7,899,418 B2 | 3/2011 | Ishiyama et al. | |
| 2008/0229050 A1 | 9/2008 | Tillgren | |

* cited by examiner

*Primary Examiner* — Temica M Beamer
*Assistant Examiner* — Joel Ajayi

(57) ABSTRACT

A method and apparatus for reducing power consumption of a portable electronic device, such as a smartphone, other mobile phones, or other portable devices when in sleep mode. A small software agent, or a low power mode core, operates so that, while the electronic device is in sleep mode, the low power mode core may be kept alive. When implemented in a smartphone, for example, the low power mode core may react to an incoming call so that at least part of the external memory of the smartphone may be powered down. When there is an incoming call, the low power mode core may acknowledge the call and provide a user interface (UI) for answering the call before the operating system is resumed, so as to keep the same or similar phone usage experience as when the operating system is processing the incoming call. At the same time, the low power mode core may wake up the operating system. The same approach is applicable in monitoring devices, where the entire device need not be running.

20 Claims, 2 Drawing Sheets

METHOD AND APPARATUS FOR REDUCING POWER CONSUMPTION IN A PORTABLE ELECTRONIC DEVICE

CROSS REFERENCE TO RELATED APPLICATION

This application is a continuation of U.S. application Ser. No. 12/130,885, filed on May 30, 2008, which claims the benefit of U.S. Provisional Application No. 60/940,843, filed on May 30, 2007. The disclosures of the applications referenced above are incorporated herein by reference in their entireties.

BACKGROUND

1. Field of the Invention

The present invention relates generally to power management, and more particularly to a method of reducing power consumption in a portable electronic device.

2. Description of Related Art

Continued advancements in telecommunication technologies have made mobile phones, smartphones and other portable electronic devices very popular. Because talk time and standby time are important performance attributes of such devices, techniques for extending battery life or otherwise reducing power consumption are becoming increasingly important.

To extend battery life, a smartphone may enter a low power mode (or sleep mode) when it is idle, that is, when the smartphone is on but there is no interaction with any user or any user terminal. While in sleep mode, a phone may turn off much of its circuitry until the smartphone is awakened, e.g., by a user input or an incoming call. However, the external memory of existing smartphones, e.g., DDR (Double Data Rate memory) or SDRAM (Synchronous Dynamic Random Access Memory), cannot be fully powered down and has to be put into a self refresh mode or other low power mode which can retain the content of the external memory. One reason behind this is to avoid missing incoming calls, since the smartphone needs to acknowledge an incoming call in a few milliseconds, but it may take much longer to restore the external memory and the operation of the phone if the external memory is fully powered down.

A laptop computer may use the hibernate feature to save battery power, where the content of its RAM may be written to non-volatile storage, such as a hard disk drive, before powering down the system. When being turned on again, the system can be restored to the state it was in when the hibernation was invoked, so that programs can continue to be executed as if the hibernation never happened. Although resuming from hibernation is faster than a hard reboot, it may take several seconds, much longer than the time in which a smartphone is required to acknowledge an incoming call.

Since keeping external memory of a smartphone in self refresh mode consumes considerable power, it may be desirable to provide a method and apparatus which can reduce power consumption of a smartphone while in sleep mode.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present application describes a method and apparatus for reducing power consumption of a smartphone, a mobile phone or other portable electronic devices while in sleep mode. A small software agent, or a low power mode core, operates so that, while the device is in sleep mode, the low power mode core may be kept alive and may react to baseband events, such as an incoming call, so that at least part of the external memory of the smartphone may be powered down. When there is an incoming call, the low power mode core may acknowledge the call and provide a user interface (UI) for answering the call before the operating system (OS) of the smartphone is resumed, so as to keep the same or similar phone usage experience as the operating system is processing the incoming call. At the same time, the low power mode core may wake up the operating system.

The low power mode core may be put into an internal SRAM (Synchronous Random Access Memory) and kept alive during the sleep mode, so that the entire external memory may be powered down after its content has been backed up in non-volatile storage spaces (e.g., NAND or NOR flash memory). Alternatively, the low power mode core may be put into one area of the external memory, so that other areas of the external memory may be powered down. Consequently, at least part of the external memory of the smartphone may be powered down during the sleep mode, and the battery life of the smartphone may be improved. The invention may be carried out by computer-executable instructions. Advantages of the present invention will become apparent from the following detailed description.

Figure 1:
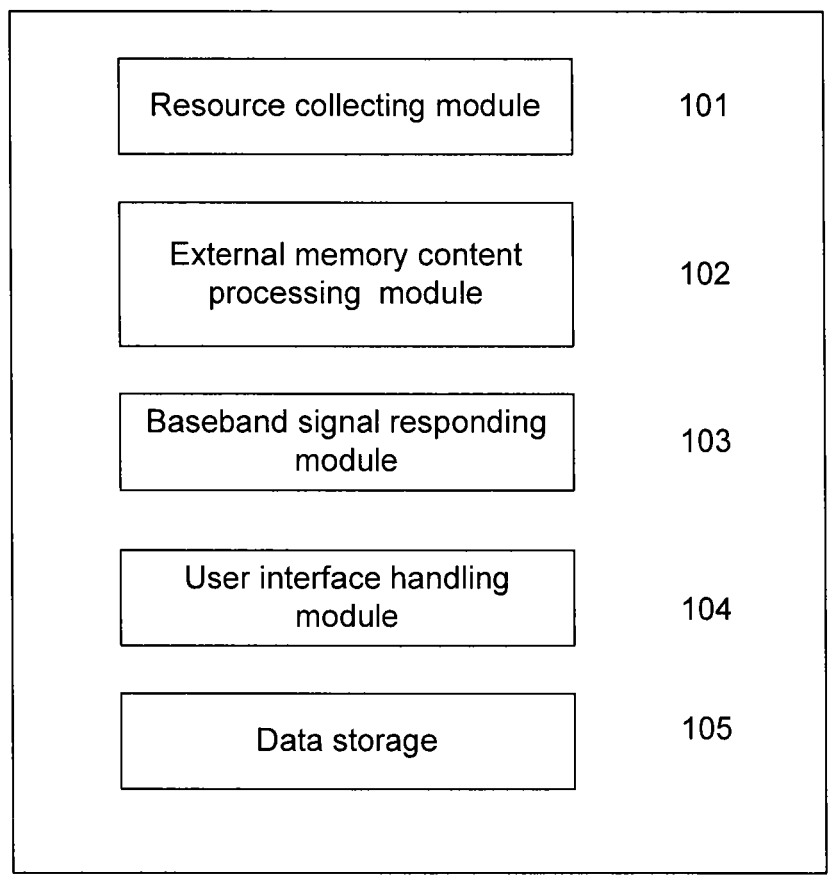
FIG. 1 illustrates an architecture of a low power mode core of a smartphone according to one embodiment of the present invention.

FIG. 1 illustrates an architecture of a low power mode core of a smartphone according to one embodiment of the present invention. The low power mode core may include a small self executable software agent, which may reside in the internal SRAM or one area of the external memory. As shown, in one embodiment, the low power mode core 100 of a smartphone may include: a resource collecting module 101, an external memory content processing module 102, a baseband signal responding module 103, a user interface handling module 104 and a data storage area 105.

One popular feature of smartphones is to display a caller's name or play a ring tone associated with a caller when there is an incoming call, instead of only displaying a caller's phone number, so that the called party may easily find out who is calling and decide whether to answer the call. If the external memory is kept in self refresh mode, the operating system of the smartphone may simply access a phone database to get the caller's name or ring tone, and then display or play them.

In an embodiment of the present invention, while a device is in sleep mode, only the low power mode core 100 is kept alive while the rest of the external memory and the operating system are powered down. To make sure that the user of the smartphone will have the same or similar user interface when there is an incoming call, the resource collecting module 101 may collect information needed to display a user interface, from the phone database of the smartphone, before the smartphone enters into sleep mode.

In one embodiment, the smartphone is configured to display a caller's name when there is an incoming call, then the information collected by the resource collecting module 101 may include the user's contacts' names and phone numbers. In one embodiment, the smartphone is configured to play a ring tone associated with a caller when there is an incoming call. In such a case, the information collected may include the user's contacts' phone numbers and associated ring tones. The collected information may be contained in the data storage area 105. Consequently, the low power mode core 100 may present the same or similar user interface to the user of the smartphone when there is an incoming call, even though the operating system of the smartphone has not come fully out of hibernation.

In one embodiment, the collected information may also include the user's greeting to callers when the user cannot take the call.

The external memory content processing module 102 may compress content in the external memory and store the compressed content into a non-volatile storage space before the operating system of the smartphone enters hibernation mode. The non-volatile storage space may be, e.g., a main flash. When the operating system of the smartphone is awakened, the content in the non-volatile storage space may be decompressed and the decompressed content may be stored back to the external memory. The operating system may continue to execute programs as if it had never entered the hibernation mode.

The baseband signal responding module 103 may respond to baseband events. In one embodiment, the baseband event is an incoming call. The baseband signal responding module 103 may inform the calling party that the smartphone is available/unavailable to answer the incoming call, and may inform the user interface handling module 104 about the incoming call so that the module 104 may provide a proper user interface. At the same time, the baseband signal responding module 103 may inform the external memory content processing module 102 about the incoming call so that the module 102 may start to decompress and restore previously compressed content. The baseband signal responding module 103 may also wake up the operating system of the smartphone so that the operating system may control the remaining procedure for processing the incoming call when the operating system is fully resumed.

When being informed that there is an incoming call, the user interface handling module 104 may provide appropriate user interfaces. For example, with information collected by the resource collecting module 101, the user interface handling module 104 may present a caller's name on the screen of the smartphone, or play a ring tone associated with a caller, depending on how the user has configured the smartphone. Thus, the user may have the same or similar phone usage experience as when the operating system of the smartphone is processing the incoming call. In one embodiment, when the user of the smartphone is unavailable to take the call, the user interface handling module 104 may play a greeting stored by the user to the caller.

The data storage area 105 may contain data needed during execution of the low power mode core 100, including data collected by the resource collecting module 101 from the phone database of the smartphone such as the user's contacts' phone numbers, names, associated ring tones and the user's greeting to callers. In one embodiment, the data collected by the resource collecting module 101 may be stored in external non-volatile storage devices, and the low power mode core may access the data using a device driver.

Figure 2:
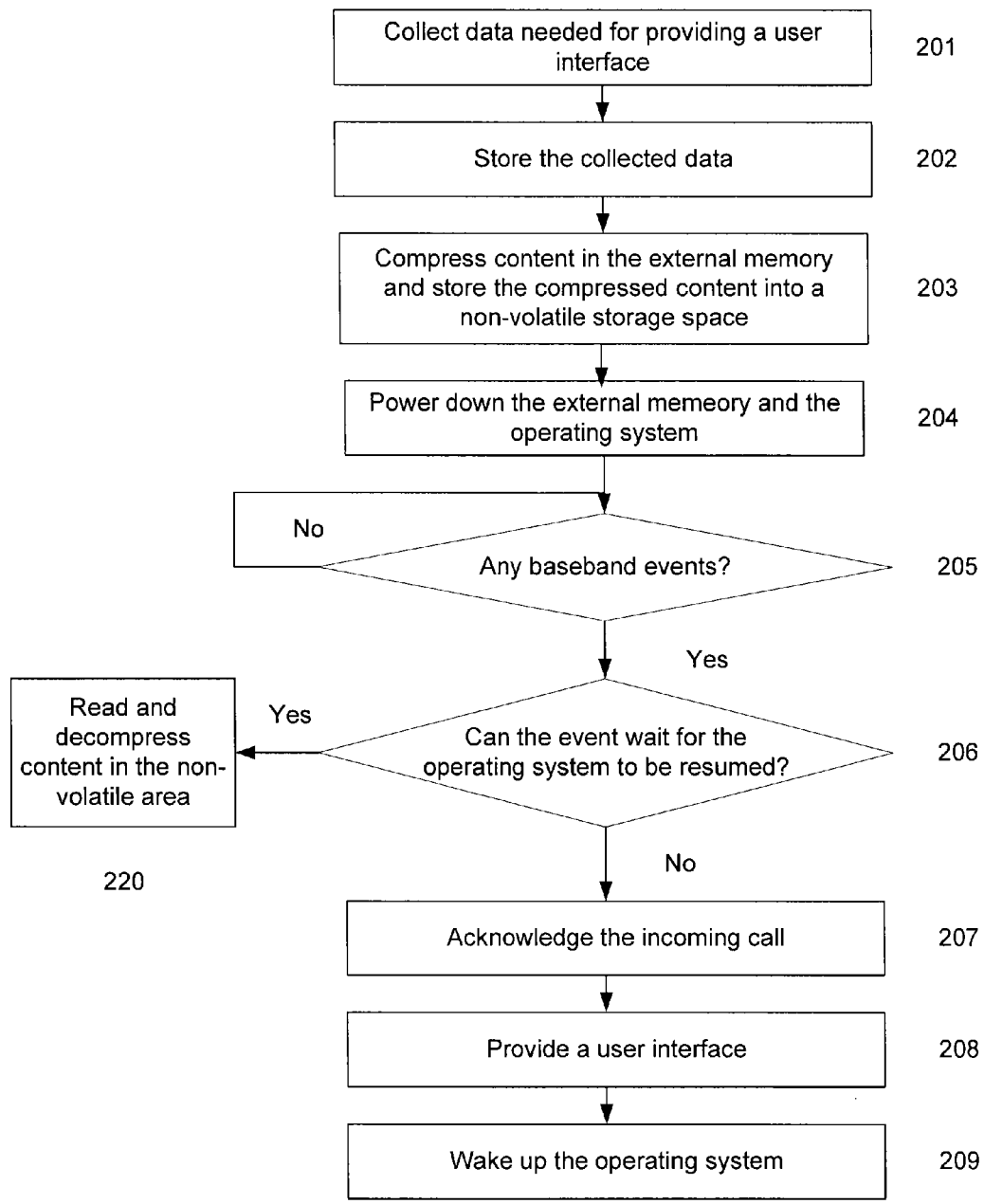
FIG. 2 illustrates a flow chart of the operation of a low power mode core in a smartphone according to one embodiment of the present invention.

FIG. 2 illustrates a flow chart of the operation of a low power mode core in a smartphone according to one embodiment of the present invention.

At 201, when the operating system of the smartphone is running, the resource collecting module 101 may collect information needed to provide user interfaces when the low power mode core 100 responds to an incoming call. Such information may help to keep the incoming call response experience similar when either the low power mode core 100 or the smartphone's operating system responds to an incoming call. The collected information may include the user's contacts' phone numbers, names, associated ring tones and the user's greeting to callers.

At 202, the collected information may be stored in the data storage area 105.

At 203, the external memory content processing module 102 may compress content of the external memory and store the compressed content into a non-volatile storage space.

At 204, at least part of the external memory may be powered down. If the internal SRAM is available, the low power mode core may reside there, and the entire external memory of the smartphone may be powered down after its content is stored in a non-volatile storage space at 203. If there is no available internal SRAM, the low power mode core 100 may reside in a portion of the external memory after the content of the external memory is stored in a non-volatile storage space. The portion of the external memory in which the low power mode core 100 resides may be kept in self refresh mode, and the rest of the external memory may be powered down. The operating system may then enter hibernation mode.

At 205, it is determined whether there are any baseband events.

If there is a baseband event, it may be determined at 206 whether it is an event requiring response before the operating system is resumed. In one embodiment, the time required for the operating system to be resumed and the time required for responding various baseband events are stored in the data storage area 105.

If a baseband event can wait for the operating system to resume, the process may proceed to 220. Such a baseband event may be, e.g., a short message (SMS) or a multimedia message (MMS). At 220, the low power mode core 100 may only need to read the content of the external memory from the non-volatile storage space and decompress and restore the content by its external memory content processing module 102.

If the time required for resuming the operating system is longer than the time period during which a baseband event, e.g., an incoming call, must be acknowledged, the baseband event responding module 103 may acknowledge the incoming call at 207.

In one embodiment, events may be categorized as: events that may be handled by the low power mode core, and events requiring the operating system to be resumed. The low power mode core may handle events belonging to the first category and wake up the operating system for events belonging to the second category.

At 208, the user interface handling module 104 may provide user interfaces with information collected by the resource collecting module 101 and according to the user's configuration of the smartphone, so that the user may have the same or similar phone usage experience as when the operating system is processing the incoming call.

The low power mode core 100 may wake up the operating system at 209. Although 209 is shown after 208, it should be understood that it may happen immediately after 205.

Although the embodiments above use a smartphone as an example, the invention may be used in any portable or other electronic devices which use batteries and need to acknowledge or send out signals before a hibernated operating system fully resumes. One example is a device monitoring a patient's medical condition, in which the device has to send out an alarm as soon as a threshold value is reached and therefore cannot wait for the operating system to fully resume.

Several features and aspects of the present invention have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. A method for reducing power consumption in a mobile device, the method comprising:
   powering down at least part of a memory of the mobile device during a sleep mode;
   keeping a low power mode core powered on, the low power mode core included in the memory, the memory formed only of a single memory type; and
   responding by the low power mode core to an event while the at least part of the memory remains in the sleep mode and enabling a user interface for answering the event when the event is an incoming call.

2. The method of claim 1, further comprising:
   monitoring the event which requires the mobile device to respond within a predetermined period of time.

3. The method of claim 1, further comprising:
   collecting data needed for enabling the user interface when answering the incoming call.

4. The method of claim 1, further comprising:
   compressing content in the memory and storing the compressed content in a non-volatile memory before powering down the at least part of the memory.

5. The method of claim 4, further comprising:
   reading contents of the non-volatile memory, and decompressing the contents when an operating system of the mobile device is awakened.

6. The method of claim 1, further comprising:
   causing an operating system of the mobile device to enter a hibernation mode.

7. The method of claim 1, further comprising:
   responding to the incoming call with acknowledgment by the low power mode core.

8. The method of claim 1, further comprising:
   waking up an operating system of the mobile device via the low power mode core.

9. The method of claim 1, further comprising:
   determining whether the event can wait for an operating system to fully resume from a hibernation mode.

10. The method of claim 9, wherein the event is a baseband event.

11. The method of claim 9, wherein the event is a short message (SMS).

12. The method of claim 9, wherein the event is a multimedia message (MMS).

13. The method of claim 1, further comprising:
    reading content in the memory and storing such content in a non-volatile memory before powering down the at least part of the memory.

14. The method of claim 1, further comprising:
    keeping the low power mode core powered on, the low power mode core included in the memory, the memory formed only of the single memory type that is synchronous random access memory (SRAM) type.

15. The method of claim 1, further comprising:
    powering down the entire memory during the sleep mode.

16. The method of claim 1, further comprising:
    keeping a portion of the memory in a self-refresh mode, the low power mode core resides in the portion, and powering down the remainder of the memory during the sleep mode.

17. An apparatus for reducing power consumption of a mobile device, comprising:
    a memory of the mobile device, at least part of the memory configured to be powered down during a sleep mode; and
    a low power mode core included in the memory, the memory formed only of a single memory type, the low power mode core configured to stay powered on, respond to an event while the at least part of the memory remains in the sleep mode and enable a user interface for answering the event when the event is an incoming call.

18. The apparatus of claim 17, wherein the low power mode core is further configured to monitor the event which requires the mobile device to respond within a predetermined period of time.

19. The apparatus of claim 17, further comprising:
    a resource collecting module configured to collect data needed for enabling the user interface when answering the incoming call.

20. The apparatus of claim 17, further comprising:
    an memory content processing module configured to compress content in the memory and store the compressed content in a non-volatile memory before powering down the at least part of the memory.

* * * * *